United States Patent
MacIntosh et al.

(10) Patent No.: US 12,156,526 B2
(45) Date of Patent: Dec. 3, 2024

(54) COMPOSITIONS AND METHODS RELATING TO SHORTENING

(71) Applicant: University of Florida Research Foundation, Inc., Gainesville, FL (US)

(72) Inventors: Andrew J. MacIntosh, Gainesville, FL (US); Gloria Cagampang, Newberry, FL (US); Susan S. Percival, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 335 days.

(21) Appl. No.: 17/264,553

(22) PCT Filed: Aug. 22, 2019

(86) PCT No.: PCT/US2019/047766
§ 371 (c)(1),
(2) Date: Jan. 29, 2021

(87) PCT Pub. No.: WO2020/041628
PCT Pub. Date: Feb. 27, 2020

(65) Prior Publication Data
US 2021/0315226 A1     Oct. 14, 2021

Related U.S. Application Data

(60) Provisional application No. 62/721,144, filed on Aug. 22, 2018.

(51) Int. Cl.
*A23D 9/013* (2006.01)
*A23D 9/04* (2006.01)
*C11C 3/10* (2006.01)

(52) U.S. Cl.
CPC .............. *A23D 9/013* (2013.01); *A23D 9/04* (2013.01); *C11C 3/10* (2013.01)

(58) Field of Classification Search
CPC ............. A23D 9/013; A23D 9/04; C11C 3/10
See application file for complete search history.

(56) References Cited

U.S. PATENT DOCUMENTS

| | | | |
|---|---|---|---|
| 2007/0082112 A1* | 4/2007 | Kincs | C11C 3/10 426/601 |
| 2008/0199590 A1 | 8/2008 | Kincs et al. | |
| 2014/0272081 A1* | 9/2014 | Volker | A23G 3/343 426/601 |

OTHER PUBLICATIONS

Berger, K. G., and Nor Aini Idris. "Formulation of zero-trans acid shortenings and margarines and other food fats with products of the oil palm." Journal of the American Oil Chemists' Society 82.11 (2005): 775-782.

(Continued)

*Primary Examiner* — Donald R Spamer
*Assistant Examiner* — Assaf Zilbering
(74) *Attorney, Agent, or Firm* — Thomas | Horstemeyer LLP

(57) ABSTRACT

The present disclosure pertains to shortening blend compositions comprising a first oil, a second oil, and an emulsifier. The disclosed shortening blend compositions can comprise a first oil with an oleic acid content of about 50% or more and a saturated fatty acid content of about 35% or less; a second oil with an oleic acid content of about 75% or more and a saturated fatty acid content of about 20% or less; wherein the first oil and the second oil are derived from different sources; and an emulsifier. Also disclosed are methods of making the disclosed shortening blends and food products comprising a disclosed shortening blend. This abstract is intended as a scanning tool for purposes of searching in the particular art and is not intended to be limiting of the present disclosure.

9 Claims, 4 Drawing Sheets

(56) References Cited

OTHER PUBLICATIONS

Bazlul, Mobin Siddique, et al. "Physico-chemical properties of blends of palm olein with other vegetable oils." Grasas y Aceites (Sevilla) 61.4 (2010): 423-429.
Litwinenko, J. W., et al. "Relationship between crystallization behavior, microstructure, and mechanical properties in a palm oil-based shortening." Journal of the American oil chemists' society 79.7 (2002): 647-654.
Nor Aini, Idris, and Mat Sahri Miskandar. "Utilization of palm oil and palm products in shortenings and margarines." European Journal of Lipid Science and Technology 109.4 (2007): 422-432.
Hashempour-Baltork, Fataneh, et al. "Vegetable oil blending: A review of physicochemical, nutritional and health effects." Trends in Food Science & Technology 57 (2016): 52-58.
Mayamol, P. N., et al. "Zero-trans shortening using palm stearin and rice bran oil." Journal of the American Oil Chemists' Society 81.4 (2004): 407-413.
International Search Report and Written Opinion for PCT/US2019/047766 of Oct. 18, 2019.
Ramli et al., Physio-chemical Properties and Performance of High Oleic and Palm-Based Shortenings, Journal of Oleo Science, vol. 57, No. 11, 2008.

* cited by examiner

COMPOSITIONS AND METHODS RELATING TO SHORTENING

CROSS-REFERENCE TO RELATED APPLICATIONS

This application is the 35 U.S.C. § 371 national stage application of PCT Application No. PCT/US2019/047766, filed Aug. 22, 2019, where the PCT claims priority to, and the benefit of, U.S. provisional application entitled "COMPOSITIONS AND METHODS RELATING TO SHORTENING" having Ser. No. 62/721,144, filed Aug. 22, 2018, both of which are herein incorporated by reference in their entireties.

BACKGROUND

Oleic acid is a monounsaturated omega-9 fatty acid. It is a common component of vegetable oils, particularly of olive oil where its consumption has been associated with decreased blood pressure in humans (Teres, S., et al. (2008). Proc. Natl. Acad. Sci. 105(37): 13811-6). Due to the documented nutritional benefits over saturated fatty acids, breeders have created high oleic acid variants of many traditional oil crops including canola, sunflower, palm, and soybean. The US Oil Market recently announced the massive adoption of high oleic cultivars and the subsequent availability of Plenish (oil created from high oleic soybeans) that contains high levels of omega-9 fatty acid (76%) and very low level of saturated fat (11.3%). Production is currently at 300 million pounds annually and is expected to triple by 2020 (e.g., see Qualisoy brochure product, "US-Grown High Oleic Soybean Oil: Innovation from Field to Plate"; 2017). While there are many functional improvements to the high oleic oils (such as oxidation resistance and extended shelf length), there are physical differences that deter its use in existing recipes.

Standard palm oil (low Oleic) is commonly used as household cooking oil around the world, however it is not typically used without blending in the US due to high levels of saturated fat (>50%). Limited saturated fat is required in shortening blends to achieve the desired consistency, and fractions of palm oil are currently blended with soy oil to achieve the desired concentration of saturated fats. Soy bean oil was used in the past, however the process to create saturated fats in soy bean oil also generated trans-fatty acids which have been shown to be detrimental to human health, and as of June 2018, may no longer be used in food products. The new varieties of High Oleic Palm Oil (HOPO) contains the necessary saturated fats in addition to high levels of omega-9 fatty acid (53.5% of oleic fatty acid) and sufficient levels of saturated fatty acids (33.1%). As a result, HOPO is touted to be a nutritionally superior oil, however, there remains difficulty marketing HOPO in the US due to its association to standard palm oil.

There is currently an opportunity to promote blends of the novel high oleic oils that will support the use of the nutritional superior oils while maintaining or improving existing characteristics present in existing shorteners.

Accordingly, there is a need to address the aforementioned deficiencies and inadequacies.

SUMMARY

Described herein are compositions and methods relating to shortening. Compositions and methods as described herein can have applications in the food industries, for example in as a food ingredient.

In various aspects, the present disclosure pertains to shortening blend compositions comprising a first oil, a second oil, and an emulsifier.

In a further aspect, the present disclosure pertains to shortening blend compositions comprising a first oil with an oleic acid content of about 50 wt % or more and a saturated fatty acid content of about 35 wt % or less; a second oil with an oleic acid content of about 70% or more and a saturated fatty acid content of about 20% or less; and an emulsifier; wherein the first oil and the second oil are derived from different sources; and wherein the shortening blend composition has a total saturated fatty acid content of about 35% or less.

In various aspects, the present disclosure pertains to methods of making the disclosed shortening blends.

In a further aspect, the present disclosure pertains to methods of producing a shortening blend composition, comprising: heating a mixture of a first oil and a second oil in a temperature-controlled reaction vessel to a temperature above crystallization temperature but below the oil smokepoint; adding the emulsifier under vigorous agitation until the emulsifier is completely dissolved; lowering the temperature of the vessel to induce crystal formation; and scraping the heat exchange region of the reaction vessel as crystals form on the walls of the reaction vessel to dislodge crystals and form a homogenous mixture.

In various aspects, the present disclosure pertains to food products comprising a disclosed shortening blend.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE FIGURES

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

Figure 1:
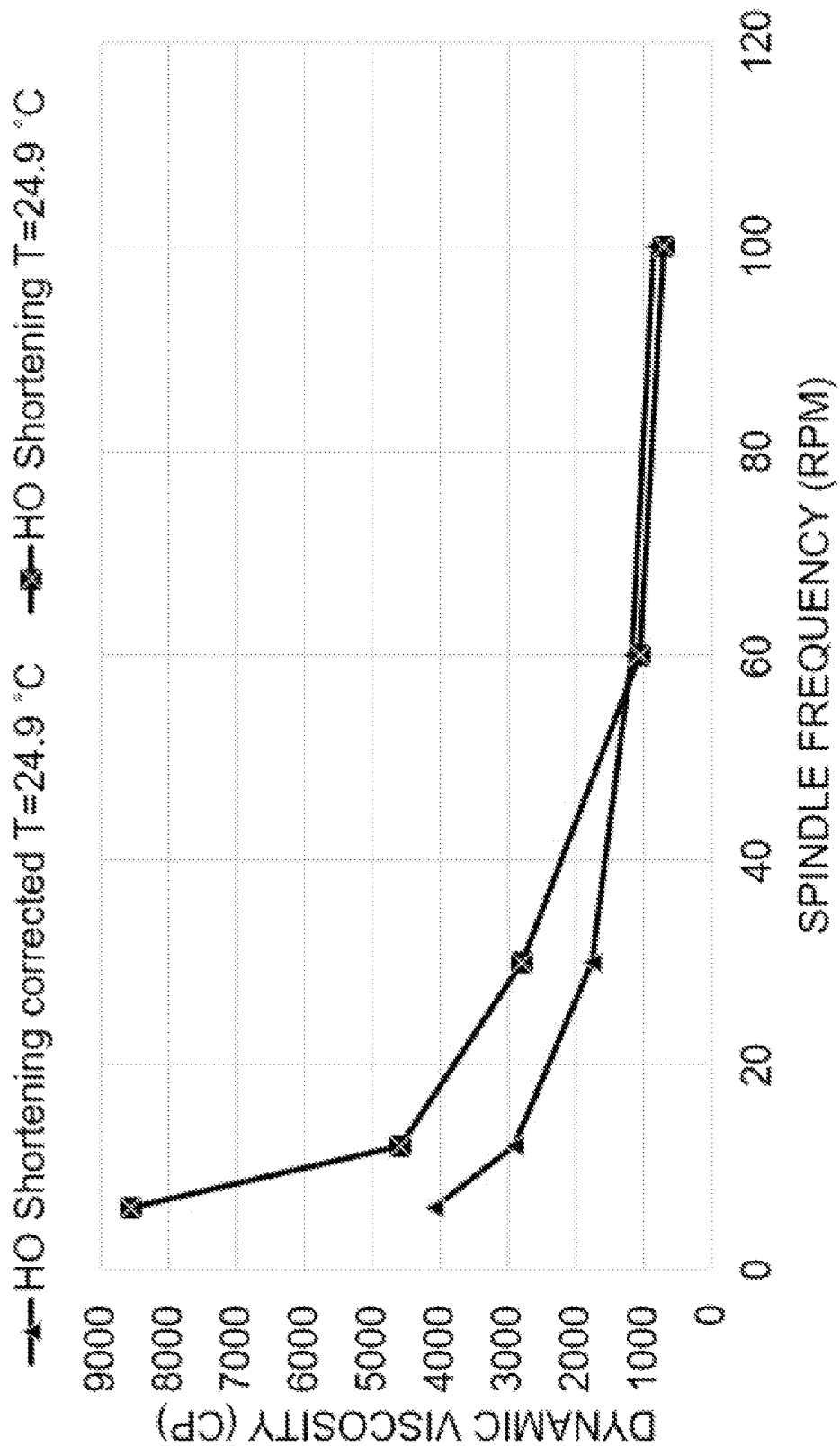
FIG. 1 shows representative kinematic viscosity data at different shear rates for representative disclosed shortening blend compositions as described in Example 2 herein below.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used herein, the term "and/or" includes any and all combinations of one or more of the associated listed items. Expressions such as "at least one of," when preceding a list of elements, modify the entire list of elements and do not modify the individual elements of the list.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

Unless otherwise defined, all technical and scientific terms used herein have the same meaning as commonly understood by one of ordinary skill in the art of organic chemistry and/or food sciences. Although methods and materials similar or equivalent to those described herein can be used in the practice or testing of the present disclosure, suitable methods and materials are described herein.

Reference to "a" chemical compound or mixture of chemical compounds refers to one or more molecules of each of the chemical compounds rather than being limited to a single molecule of the chemical compound. Furthermore, the one or more molecules may or may not be identical, so long as they fall under the category of the chemical compound. Thus, for example, "a" chemical compound is interpreted to include one or more molecules of the chemical, where the molecules may or may not be identical (e.g., different isotopic ratios, enantiomers, and the like).

As used in the specification and the appended claims, the singular forms "a," "an," and "the" may include plural referents unless the context clearly dictates otherwise. Thus, for example, reference to "an oil" includes a combination or mixture of oils. In this specification and in the claims that follow, reference will be made to a number of terms that shall be defined to have the following meanings unless a contrary intention is apparent.

"Emulsifier" as used herein refers to a natural or synthetic substance that promotes the formation and improves the stability of emulsions. The unifying characteristic of an emulsifier is the presence of a hydrophilic group and a lipophilic group on the same molecule. In some instances, an emulsifier comprises one or more monoglycerides, one or more diglycerides, one or more triglycerides, or combinations thereof.

"Fatty acid" as used herein refers to a carboxylic acid with an aliphatic chain. "Saturated fatty acid" refers to a fatty acid with no C=C double bonds, for example lauric acid, palmitic acid, or stearic acid.

"Unsaturated fatty acid" refers to a fatty acid with one or more C=C double bonds, for example oleic acid.

"HOPO" as used herein refers to a high-oleic palm oil having an oleic acid content of at least about 50%.

"HOSO" as used herein refers to a high-oleic soybean oil having an oleic acid content of at least about 50%. An exemplary, but non-limiting, commercially available HOSO is Plenish® soybean oil.

As used herein the terms "weight percent," "wt %," and "wt. %," which can be used interchangeably, indicate the percent by weight of a given component based on the total weight of the composition, unless otherwise specified. That is, unless otherwise specified, all wt % values are based on the total weight of the composition. It should be understood that the sum of wt % values for all components in a disclosed composition or formulation are equal to 100.

Used herein throughout are reference to percent content of a component, e.g., oleic acid content or saturated fatty acid content. It is to be understood that the percent content is a weight percent content unless otherwise specified.

Aspects of the present disclosure provide for compositions and methods relating to shortening. Compositions and methods relating to shortening as described herein can be used.

Described herein are compositions and methods relating to shortening blends comprising a ratio of oils required to achieve the saturated fat content, the quantity of emulsifier, and the application of appropriate shear during cooling as to achieve the proper crystal structure. This will have a direct impact upon the stability, nutritional value, viscosity and ease of manufacture for disclosed shortening blends. Shortening blends as disclosed herein can have desirable qualities, such as one or more of the following:

1. High levels of omega-9 fatty acid;
2. Reduced level of saturated fats;
3. Extended level of shelf life stability;
4. Suitability to multi-purpose usages as shortening in foods & baked goods;
5. Improved convenience when handling (totes, tankers); and
6. Reduced manufacturing cost compared to current palm oil product.

Disclosed shortening blend compositions can comprise a first oil, a second oil, and an emulsifier. Without wishing to be bound by a particular theory, it is believed that the presence of an emulsifier can help prevent the separation of the hydrophobic and hydrophilic constituents in the first oil and the second oil. The ratios of the first oil to the second oil can be achieved according to a target saturated fatty acid, and the first oil and the second oil (and emulsifier) can be blended to reach the target saturated fatty acid content.

In various aspects, the present disclosure pertains to shortening blend compositions comprising a first oil, a second oil, and an emulsifier.

In a further aspect, the present disclosure pertains to shortening blend compositions comprising a first oil with an oleic acid content of about 50% or more and a saturated fatty acid content of about 35% or less; a second oil with an oleic acid content of about 70% or more and a saturated fatty acid content of about 20% or less; and an emulsifier; wherein the first oil and the second oil are derived from different sources; and wherein the shortening blend composition has a total saturated fatty acid content of about 35% or less.

In a further aspect, the present disclosure pertains to shortening blend compositions comprising a first oil with an oleic acid content of about 50% or more and a saturated fatty acid content of about 35% or less; a second oil with an oleic acid content of about 70% or more and a saturated fatty acid content of about 20% or less; and an emulsifier; wherein the first oil and the second oil are derived from different sources; and wherein the shortening blend composition has a total saturated fatty acid content of about 35% or less; wherein the first oil is present in an amount of from about 30 wt % to about 100 wt %; wherein the second oil is present in an amount of from about 0 wt % to about 70 wt %; and wherein the wt % is based on the total weight of the first oil and the second oil.

In a further aspect, the present disclosure pertains to shortening blend compositions comprising a first oil with an oleic acid content of about 50% or more and a saturated fatty acid content of about 35% or less; a second oil with an oleic acid content of about 70% or more and a saturated fatty acid content of about 20% or less; and an emulsifier; wherein the first oil and the second oil are derived from different sources; and wherein the shortening blend composition has a total saturated fatty acid content of about 35% or less; wherein the first oil is present in an amount of from about 30 wt % to about 100 wt %; wherein the second oil is present in an amount of from about 0 wt % to about 70 wt %; and wherein the wt % is based on the total weight of the first oil, the second oil, and the emulsifier.

As used herein, a shortening blend is understood to refer to edible mixtures of solid and liquid fats. The disclosed shortening blends can take the form of fluffy, low density, air and water-containing soft products of the consistency of whipped butter or margarine; semi-solid "greasy" products having higher density but little or no air or moisture, such as are used for butter or lard substitution in baking or for frying; or products with the consistency of margarine or butter, having considerable water content but little air content, and ranging in consistency from soft and spreadable at room temperature or below, e.g., "soft" margarine, to solid and crumbly at room temperature, often exhibiting a "fracture" upon spreading as is observed with butter. In other words, the disclosed shortening blends can take all the forms and physical, chemical, and organoleptic characteristics of butter, lard, and their vegetable oil-based replacement products now commonly available in the marketplace.

The first oil can also be an animal-, vegetable-, or vegetable bean-derived oil that has a high oleic acid content. In various aspects, an oil with an high oleic acid content can be a high oleic safflower oil, high oleic canola oil, high oleic peanut oil, high oleic corn oil, high oleic rapeseed oil, high oleic sunflower oil, high oleic cottonseed, high oleic *lesquerella* oil, high oleic palm oil, high oleic castor oil, high oleic meadowfoam oil, and high oleic soybean oil, or combinations thereof. In a further aspect, the first oil comprises one or more high oleic palm oil.

In various aspects, the first oil is an oil with an oleic acid content of about 50% or greater. In a further aspect, the first oil is an oil with an oleic acid content of about 50%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, any combination of the foregoing values, or ranges comprising combinations of the foregoing values.

In an aspect, the first oil is palm oil with a high oleic acid content (i.e., high oleic palm oil, HOPO). In a further aspect, the first oil is a palm oil with an oleic acid content of about 50%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, any combination of the foregoing values, or ranges comprising combinations of the foregoing values.

In various aspects, the first oil is an oil with a saturated fatty acid content of about 35% or less. In a further aspect, the first oil is an oil with a saturated fatty acid content of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, any combination of the foregoing values, or ranges comprising combinations of the foregoing values.

In various aspects, the first oil is a high oleic palm oil with a saturated fatty acid content of about 1%, about 2%, about 3%, about 4%, about 5%, about 6%, about 7%, about 8%, about 9%, about 10%, about 10%, about 11%, about 12%, about 13%, about 14%, about 15%, about 16%, about 17%, about 18%, about 19%, about 20%, about 20%, about 21%, about 22%, about 23%, about 24%, about 25%, about 26%, about 27%, about 28%, about 29%, about 30%, about 30%, about 31%, about 32%, about 33%, about 34%, about 35%, any combination of the foregoing values, or ranges comprising combinations of the foregoing values.

In various aspects, the first oil has a high content of mono- and di-unsaturated fatty acids. In a further aspect, the first oil has a level of carotenes that is about 500 ppm to about 700 pm.

In an aspect, the first oil has a high level of vitamin E. In a further aspect, the first oil has a level of vitamin E that is about 420 ppm to about 700 ppm.

In various aspects, the first oil has an iodine value of greater than or equal to about 60, about 61, about 62, about 63, about 63, about 64, about 65, about 66, about 67, about 68, about 69, about 70, about 71, about 72, about 73, about 73, about 74, about 75, about 76, about 77, about 78, about 79, about 80, about 81, about 82, about 83, about 83, about 84, about 85, about 86, about 87, about 88, about 89, about 90, about 91, about 92, about 93, about 93, about 94, about 95, about 96, about 97, about 98, about 99, any combination of the foregoing values, or ranges comprising combinations of the foregoing values.

In various aspects, the first oil has a melting point of about 18° C. to about 20° C. In a further aspect, the first oil has a melting point of about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., any combination of the foregoing values, or ranges comprising combinations of the foregoing values.

The second oil can also be an animal-derived, vegetable-derived, or vegetable bean-derived oil that has a high oleic acid content. In various aspects, an oil with an high oleic acid content can be a high oleic safflower oil, high oleic canola oil, high oleic peanut oil, high oleic corn oil, high oleic rapeseed oil, high oleic sunflower oil, high oleic cottonseed, high oleic *lesquerella* oil, high oleic palm oil, high oleic castor oil, high oleic meadowfoam oil, and high oleic soybean oil, and combinations thereof. In an aspect, the second oil can have an oleic acid content (omega-9 mono-unsaturated fatty acid) of about or greater than 75%. In a further aspect, the second oil is a high oleic soybean oil, a canola oil, e.g., a canola oil with an elevated or high-oleic acid content, a rice bran oil, e.g., a rice bran oil with an elevated or high-oleic acid content, or combinations thereof.

In a further aspect, the second oil is an oil derived from soy beans with a high oleic acid content (i.e., a high oleic soybean oil or HOSO). In an aspect, the second oil is a high-oleic soybean oil. Commercially available examples of suitable high-oleic soybean oil include Plenish®.

In various aspects, the second oil is an oil with an oleic acid content of about 70% or greater. In a further aspect, the second oil is an oil with an oleic acid content of about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, any combination of the foregoing values, or ranges comprising combinations of the foregoing values.

In various aspects, the second oil is a soybean oil with an oleic acid content of about 70% or greater. In a further aspect, the second oil is a soybean oil with an oleic acid content of about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, about 96%, about 97%, about 98%, about 99%, any combination of the foregoing values, or ranges comprising combinations of the foregoing values.

In various aspects, the second oil is an oil with a saturated fatty acid content of about 20% or less. In a further aspect, the second oil is an oil with a saturated fatty acid content of about 15% or less. In a still further aspect, the second oil is an oil with a saturated fatty acid content of about 1%, about 2%, about 3%, about 4%, about 5%, about 6%, about 7%, about 8%, about 9%, about 10%, about 10%, about 11%, about 12%, about 13%, about 14%, about 15%, about 16%, about 17%, about 18%, about 19%, about 20%, any combination of the foregoing values, or ranges comprising combinations of the foregoing values.

In various aspects, the second oil is a soybean oil with a saturated fatty acid content of about 20% or less. In a further aspect, the second oil is a soybean oil with a saturated fatty acid content of about 15% or less. In a still further aspect, the first oil is a soybean oil with a saturated fatty acid content of about 1%, about 2%, about 3%, about 4%, about 5%, about 6%, about 7%, about 8%, about 9%, about 10%, about 10%, about 11%, about 12%, about 13%, about 14%, about 15%, about 16%, about 17%, about 18%, about 19%, about 20%, about 20%, any combination of the foregoing values, or ranges comprising combinations of the foregoing values.

In various aspects, the second oil can have a linoleic content of about or less than 17%; a linolenic content of about or less than 3%; a palmitic acid content of about or less than 10%; a stearic acid content of about or less than 5%; or combinations of the foregoing.

Emulsifiers as described herein can be anionic, cationic, non-ionic, amphoteric, or a combination of emulsifiers with any of the ionic properties above. In various aspects, the emulsifiers used in the disclosed shortening blend compositions can be derived from plants (or seeds of vegetables) or animals.

In various aspects, an emulsifier used in the disclosed shortening blend compositions can be a polyglycerol ester, a mono-, di- and/or triglycerides of a fatty acid, propylene glycol ester, sucrose fatty acid ester and polyoxyethylene derivatives of a sorbitan fatty acid ester and the like. Mixtures of any of the disclosed emulsifiers may also be employed.

In a further aspect, an emulsifier used in the disclosed shortening blend compositions can be one or more mono-glyceride, diglyceride, triglyceride, and combinations thereof. Emulsifiers can be further modified, e.g., ethoxylated such as mono-glycerides, di-glycerides, tri-glycerides, and combinations thereof that are ethoxylated. Emulsifiers can be lecithin or derivatives thereof. Emulsifiers can be fatty acids or fatty acid derivatives, for example polyglycerol esters (PGE), propylene glycol esters (PGMS), stearoyl lactylates, sucrose esters, sorbitan esters and polysorbates. In various aspects, further suitable polyglycerol esters include triglyceryl monostearate, hexaglyceryl distearate, hexaglyceryl monopalmate, hexaglyceryl dipalmitate, decaglyceryl distearate, decaglyceryl monoleate, decaglyceryl dioleate, decaglycerol monopalmitate, decaglycerol dipalmitate, decaglyceryl monostearate, octaglycerol monoleate, octaglycerol monostearate and decaglycerol mono-caprylate. In an aspect, an emulsifier such as one of the Trancendim® product line (an emulsifier comprising mono and diglycerides that has been further processed to increase the diglyceride content), e.g., Trancendim® 130 (Corbion, In Lenexa, Kansan, US). The amount of emulsifier added to the blend of the first oil and second oil can be an amount which allows the mixture to reach a target fatty acid content.

In some aspects, the emulsifier comprises essentially only a combination of one or more monoglycerides, diglycerides, and triglycerides. In a further aspect, the emulsifier comprises essentially only a combination of one or more monoglycerides and diglycerides.

In a further aspect, a suitable emulsifier for use in the disclosed shortening blend compositions can include one or more of (with HLB values provided in the brackets, [[ ]]: decaglycerol monolaurate[15.5]; decaglycerol distearate [10.5]; decaglycerol dioleate [10.5]; decaglycerol dipalmitate [11.0]; decaglycerol monostearate [13.0]; decaglycerol monooleate [13.5]; hexaglycerol monostearate [12.0]; hexaglycerol monooleate [10.5]; hexaglycerol monoshortening [12.0]; polyoxyethylene (20) sorbitan monolaurate [16.7]; polyoxyethylene (4) sorbitan monolaurate [13.3]; polyoxyethylene (20) sorbitan monopalmitate [15.6]; polyoxyethyLene (20) sorbitan monostearate [14.9]; polyoxyethylene (20) sorbitan tristearate [10.5]; polyoxyethylene (20) sorbitan monooleate [15.0]; polyoxyethylene (5) sorbitan monooleate [10.0]; polyoxyethylene (20) sorbitan trioleate [11.0]. As is appreciated by those with skill in the art, the HLB value for a surfactant is an expression of its Hydrophile-Lipophile balance, i.e., the balance of the size and strength of the hydrophilic (polar) and lipophilic (non-polar) groups of the surfactant.

In various aspects, the first oil and the second oil are blended to obtain a suitable target saturated fatty acid content. In a further aspect, the target saturated fatty acid content is about 5% to about 35%. In a yet further aspect, the target saturated fatty acid content is about 25% to about 35%. In a still further aspect, the target saturated fatty acid content is about 30%. In an even further aspect, the target saturated fatty acid content is about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, any combination of the foregoing values, or ranges comprising combinations of the foregoing values.

The disclosed shortening blends can further comprise shortening ingredients known to the skilled artisan. For example, the disclosed shortening blends can further comprise additional emulsifiers and compatibilizers, e.g., lecithin and oil based vitamins, e.g. vitamin A and β-carotene; as well as both oil soluble and water soluble flavorants. The disclosed shortening blends can also further comprise milk and/or milk solids; a food-compatible salt such as KCl or NaCl; a food-grade preservative, e.g. sodium ascorbate or sodium benzoate; and antioxidants, e.g., BHT.

The disclosed shortening blends can also contain nutraceuticals or pharmaceuticals, for example ingredients believed to lower cholesterol or be otherwise beneficial, such as the fatty acid esters of phytosterols or plant sterols, e.g., stanol or sterol fatty acid esters. The composition may also contain esters of ω-3 and ω-6 fatty acids, and other products believed to be "health smart."

The present disclosure also pertains to products comprising the disclosed shortening blends, e.g., fried foods; icings, such as a cream icing; and baked goods, such as short bread cookies, biscuits, pie crusts, or puff pastry shells.

The baked goods may contain even a predominant proportion of other constituents, for example, flour, sugar or other sweeteners, egg or egg products, milk or milk products such as cream, whipped cream, butter, buttermilk, cream cheese, etc., emulsifiers such as mono- and diglycerides, flavorings such as vanilla or almond extracts, cocoa, cinnamon, coconut, fruit, water, salt, icing, and other ingredients, without limitation.

The icing may contain other constituents, for example, sugar or other sweeteners, egg or egg products, milk or milk products such as cream, whipped cream, butter, buttermilk, cream cheese, etc., emulsifiers such as mono- and diglycerides, flavorings such as vanilla or almond extracts, cinnamon, cocoa, coconut, fruit, water, salt, and other ingredients, without limitation.

Also described herein are methods for making the disclosed shortening blend. In various aspects, the disclosed methods of producing a shortening blend composition comprise: heating a mixture of a first oil and a second oil in a temperature-controlled reaction vessel to a temperature above crystallization temperature but below the oil smoke-point; slowing adding the emulsifier under vigorous agitation until the emulsifier is completely dissolved; lowering the temperature of the vessel to induce crystal formation; and scraping the heat exchange region of the reaction vessel as crystals form on the walls of the reaction vessel to dislodge crystals and form a homogenous mixture. In various aspects, the heating a mixture of a first oil and a second oil in a temperature-controlled reaction vessel to a temperature above crystallization temperature but below the oil smoke-point allows the original crystal structure of the first oil and the second oil to be eliminated, thereby allowing formation of a different crystal structure during the lowering the temperature step.

In a further aspect, the disclosed methods of preparing a disclosed shortening blend composition comprise heating a mixture having a first oil and a second oil in a temperature-controlled reaction vessel to a mixing temperature; adding an emulsifier to the mixture having the first oil and the second oil to form a crystallization mixture; lowering the temperature of the vessel to a crystal formation temperature; and scraping the heat exchange region of the reaction vessel as crystals form on the walls of the reaction vessel to dislodge crystals and form a homogenous mixture; wherein the adding the emulsifier is carried under agitation until the emulsifier is completely dissolved; and wherein the mixing temperature is above a crystallization temperature of the first oil and/or the second oil, but below the oil smoke-point of the first oil and/or second oil.

In a further aspect, in the disclosed methods, the mixing temperature is from about 20° C. to about 90° C. In a still further aspect, in the disclosed methods, the mixing temperature is from about 65° C. to about 85° C. In a yet further aspect, in the disclosed methods, the mixing temperature is from about 50° C. to about 90° C. In an even further aspect, in the disclosed methods, the mixing temperature is about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C.; any combination of the foregoing values, or ranges comprising combinations of the foregoing values.

In an aspect, the disclosed methods provide a shortening blend composition has a crystal configuration different than a crystal configuration of the first oil and of the second oil. For example, the disclosed methods provide a shortening blend composition having greater than 50% of the crystals in a beta and beta-prime crystal configuration.

It is understood that the lowering the temperature step to the crystal formation temperature is to a temperature such that crystal formation is induced in the crystallization mixture. In some aspects, the crystal formation temperature is about 5° C. to about 90° C. lower than the mixing temperature. In a further aspect, the crystal formation temperature is lower than the mixing temperature by about 5° C., about 6° C., about 7° C., about 8° C., about 9° C., about 10° C., about 11° C., about 12° C., about 13° C., about 14° C., about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., about 30° C., about 31° C., about 32° C., about 33° C., about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., about 50° C., about 51° C., about 52° C., about 53° C., about 54° C., about 55° C., about 56° C., about 57° C., about 58° C., about 59° C., about 60° C., about 61° C., about 62° C., about 63° C., about 64° C., about 65° C., about 66° C., about 67° C., about 68° C., about 69° C., about 70° C., about 71° C., about 72° C., about 73° C., about 74° C., about 75° C., about 76° C., about 77° C., about 78° C., about 79° C., about 80° C., about 81° C., about 82° C., about 83° C., about 84° C., about 85° C., about 86° C., about 87° C., about 88° C., about 89° C., about 90° C.; any combination of the foregoing values, or ranges comprising combinations of the foregoing values.

In various aspects, the crystallization mixture further comprises a compatibilizer, a flavorant, a food-compatible salt, a food-grade preservative, or combinations thereof.

Methods as described herein can comprise heating the oils in order to dissolve the emulsifier, at a temperature above the crystallization temperature of the mixture but below the smoke-point of the oils. The heating of the oils can be done in a temperature controlled reaction vessel. A non-limiting example of a commercially-available suitable temperature controlled reaction vessel that could be used in the disclosed method is a Groen 250 gallon single-motion jacketed scrape surface vacuum kettle. Other similar type jacketed scrape vacuum kettle devices are commercially available. Alternatively, a purpose-built device comprising aspects of a scraped-surface vacuum kettle can be used. After heating of the oils, the emulsifier can slowly be added to the heated oils in the reaction vessel under vigorous agitation until the emulsifier is completely dissolved.

The temperature of the vessel can then be reduced to induce the formation of crystals in a proper configuration. The lowering the temperature of the vessel to induce crystal formation can be carried out in the same reaction vessel as the foregoing heating and melting step, provided that the temperature can be controlled in a manner that allows cooling. Alternatively, the lowering the temperature of the vessel to induce crystal formation can be carried out by transferring the mixture comprising the melted and mixed first oil, second oil, and emulsifier to a pre-cooled vessel. In either context, the walls of the vessel are cool relative to the final temperature of the mixture comprising the melted and mixed first oil, second oil, and emulsifier from the heating and mixing step, thus allowing formation of crystals in a proper configuration. IT should also be understood that once the lowering the temperature of the vessel to induce crystal formation is initiated, it is important to continue mixing the mixture, typically within the central portion of the vessel and to continuously isolate the crystals that form, e.g., on the vessel wall, by a suitable method, e.g., scrapping the walls of the vessel.

In various aspects, the first oil and the second oil, prior to mixing per the disclosed method, can be largely in an alpha crystal configuration. Following mixing and emulsification of the first oil and the second oil per the disclosed method, the crystal configuration comprises an increased level of beta and beta-prime crystals. In a further aspect, following mixing and emulsification of the first oil and the second oil per the disclosed method, the crystal configuration comprises greater than 50% of the crystals in a beta and beta-prime crystal configuration. In a still further aspect, following mixing and emulsification of the first oil and the second oil per the disclosed method, the crystal configuration comprises crystals substantially all in a beta and beta-prime crystal configuration. The crystal type and distribution of crystal type can be evaluated using x-ray diffraction methods, e.g., such as those described in J Food Sci Technol. 2015 July; 52(7): 3925-3946.

The heat exchange area of the reaction vessel can be continuously scraped to dislodge crystals as they form on the wall of the vessel and to maintain a homogenous mixture. The shortening can then be transferred to a storage container, which can be sterilized, and can be maintained at room temperature.

In certain aspects, a mechanical agitator is used to agitate the compositions during the foregoing steps of the disclosed process, e.g., during the melting, heating and mixing of the mixture comprising the melted and mixed first oil, second oil, and emulsifier, and during the crystal formation step. In certain aspects, agitation is achieved by means of a scraped-surface heat exchanger known in the art of shortening manufacture. In certain aspects, processing conditions within the scraped-surface heat exchanger can be adjusted to further promote the desired shortening properties. The scraper blades prevent any build-up on the cylinder of crystals and other large particulates that can reduce thermal exchange and increase run time. A number of different operating parameters in the scraped-surface heat exchanger can be modified in order to optimize the one or more properties of the shortening (e.g., hardness, melting). For example, the speed of the scraping blades, the pumping speed through the scraped surface heat exchanger, and the exit temperature from the heat exchanger can be modified to optimize the hardness of the shortening, which is shown in the working examples below.

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is at ambient temperature, and pressure is at or near atmospheric.

Example 1

An exemplary disclosed HOPO-HOSO shortening blend was prepared using commercially available HOPO and HOSO at laboratory scale. The disclosed shortening blend can easily be replicated at small scales (100-200 L) with minimal modification to the existing food science pilot plant The HOPO used was a commercially available HOPO (Thin Oil Products, LLC, 1820 North Corporate Lakes Blvd, Suite 305 Weston, FL 33326) having a 33.1% saturated fat content. The HOSO used in the present example was Plenish® soybean oil having a 11.3% saturated fat content. For the present example, a target level of 30% saturated fat content was selected, although ratios of the oil types can be used that would provide many of the physical and nutritional aspects of this shortening blend of the present example. An oil ratio of 28% saturated fat was prepared with the emulsifier. The ratio of HOPO and HOSO required to prepare the shortening blend with 28% saturated fat was calculated using the following equation:

$$0.331(X)+0.113(1000-X)=0.28(1000)$$

Yielding, in the present example, a shortening blend prepared using 766 grams of HOPO and 234 grams of HOSO.

The blending process was carried out in a temperature controlled reaction vessel comprising a scraped surface heat exchanger at a temperature above the crystallization temperature of the oils in order to dissolve the emulsifier. This can be carried out at a temperature sufficient to clarify the mixture (melt all existing crystals), however the temperature must be maintained below the smoke-point for the given oils used. As would be apparent to the skilled artisan, the exact minimum temperature requirement is dependent upon the ratio (and chain length) of saturated fats within the recipe. At 28% saturated fat content, a temperature of 140-145° F. was determined to be sufficient.

Corbion Transcendim® T-130 is a plant-derived diglyceride emulsifier having 97% saturated fat content, was used in the present example in an amount such that after addition of the emulsifier the total saturated fat content was approximately 30%. Although Transcendim® T-130 was the emulsifier used in the present example, other emulsifiers will also function in this capacity. The amount of emulsifier used in the present example was calculated as follows:

$$0.97(X)+0.28(1000)=0.30(1000+X)$$

Thus, in the present example, 29.85 grams of the emulsifier was used.

The emulsifier was slowly added to the blended HOPO and HOSO oils in the reaction vessel under vigorous agitation until completely dissolved. The temperature was lowered to induce the formation of crystals in the proper configuration, 40-45° F. was ideal in this case, however, the temperature requirement is recipe dependent. Continuous scraping of the heat exchange area was used to dislodge crystals as they formed on the wall of the vessel and maintain a homogeneous mixture. Once the formation of the crystals was complete, the emulsion showed increased viscosity and opaqueness. At this point, the shortening was transferred to a sterilized container and maintained at room temperature. The emulsion can be tested for the following properties using standard methods known to one skilled in the art:
 1. viscosity;
 2. saturated fat content;
 3. nutritional fatty acid content (omega-9);
 4. functional testing for use as shortening in food products, e.g., cookies;
 5. types of polymorphs (crystals) formed; and
 6. sensory rating of the food prepared using the shortening (appearance, flavor and texture).

The disclosed shortening blend compositions have been discovered at a crucial time for American food processors in view of recent FDA regulations that will come into effect starting June, 2018, which prohibit further use of trans-fats in processed food. Hydrogenation is no longer an option for increasing the levels of saturated fat in domestic oils. Accordingly, shortening compositions as disclosed herein can provide an attractive alternative that also introduces omega-9 fatty acids. Formulations such as disclosed herein can be provide shortening blends comparable in physical and quality characteristics to existing shortening formulations, while being nutritionally superior.

Unless defined otherwise, all technical and scientific terms used have the same meaning as commonly understood by one of ordinary skill in the art to which this disclosure belongs. Although any methods and materials similar or equivalent to those described can also be used in the practice or testing of the present disclosure, the preferred methods and materials are now described.

Aspects of the present disclosure will employ, unless otherwise indicated, techniques of separating, testing, and constructing materials, which are within the skill of the art. Such techniques are explained fully in the literature.

Example 2

Kinematic viscosity describes how viscous the fluid is and permits comparison of the disclosed shortening blend compositions to conventional shortening blends. FIG. 1 shows two different data sets for disclosed shortening blend compositions. The disclosed shortening blend compositions were prepared as described for Example 1, except that the sample labeled "HO Shortening" was prepared using 3% by weight of Transcendim® T-130 and the sample labeled "HO Shortening corrected" was prepared using 5% by weight of Transcendim® T-130. The overall composition of the disclosed shortening blends used to obtain the data in FIG. 1 is described below in Table 1.

TABLE 1

| Oils | Quantity (g) | % w/w | % Sat FA | % MUFA | % PUFA | % Oleic acid |
|---|---|---|---|---|---|---|
| HO Shortening | | | | | | |
| Plenish | 227.20 | 0.23 | 10.70 | 76.10 | 12.70 | 76.10 |
| HOPO | 743.80 | 0.74 | 31.60 | 55.80 | 12.20 | 41.31 |
| T130 | 28.90 | 0.03 | 97.00 | 3.00 | 0.00 | 0.00 |
| Total | 999.90 | 1.00 | 28.74 | 58.88 | 11.96 | 48.02 |
| HO Shortening Corrected | | | | | | |
| Plenish | 233.01 | 0.23 | 10.70 | 76.10 | 12.70 | 76.10 |
| HOPO | 716.99 | 0.72 | 31.60 | 55.80 | 12.20 | 41.31 |
| T130 | 50.00 | 0.05 | 97.00 | 3.00 | 0.00 | 0.00 |
| Total | 1000.00 | 1.00 | 30.00 | 57.89 | 11.71 | 47.35 |

The data in FIG. 1 shows that the disclosed shortening blends can be tuned to a desired kinematic viscosity dependent upon emulsifier concentration in order to meet the requirements of a particular disclosed use.

Example 3

Figure 2:
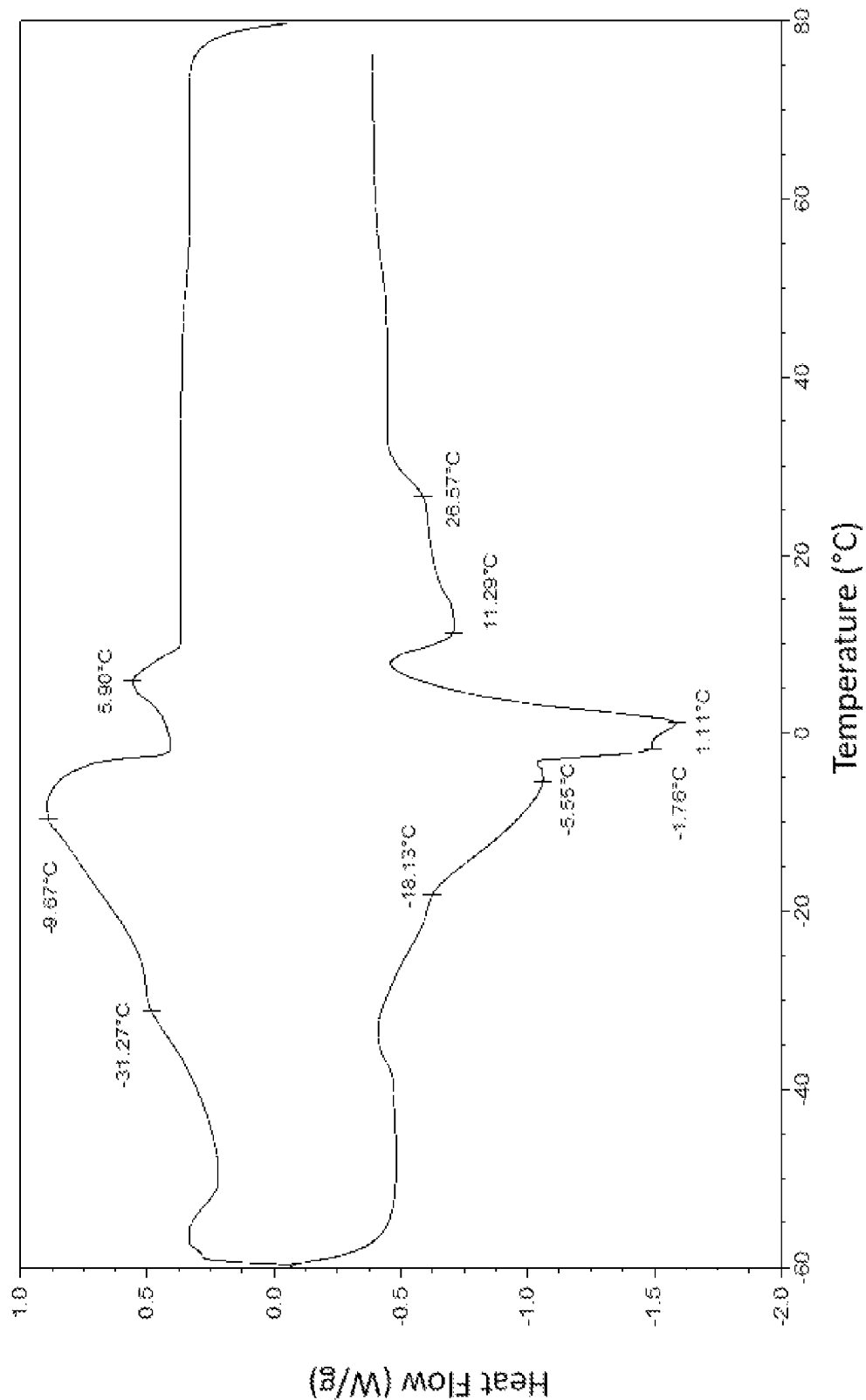
FIG. 2 shows a representative melting and cooling thermogram of High Oleic Palm Oil used in the disclosed shortening blend compositions.
Figure 3:
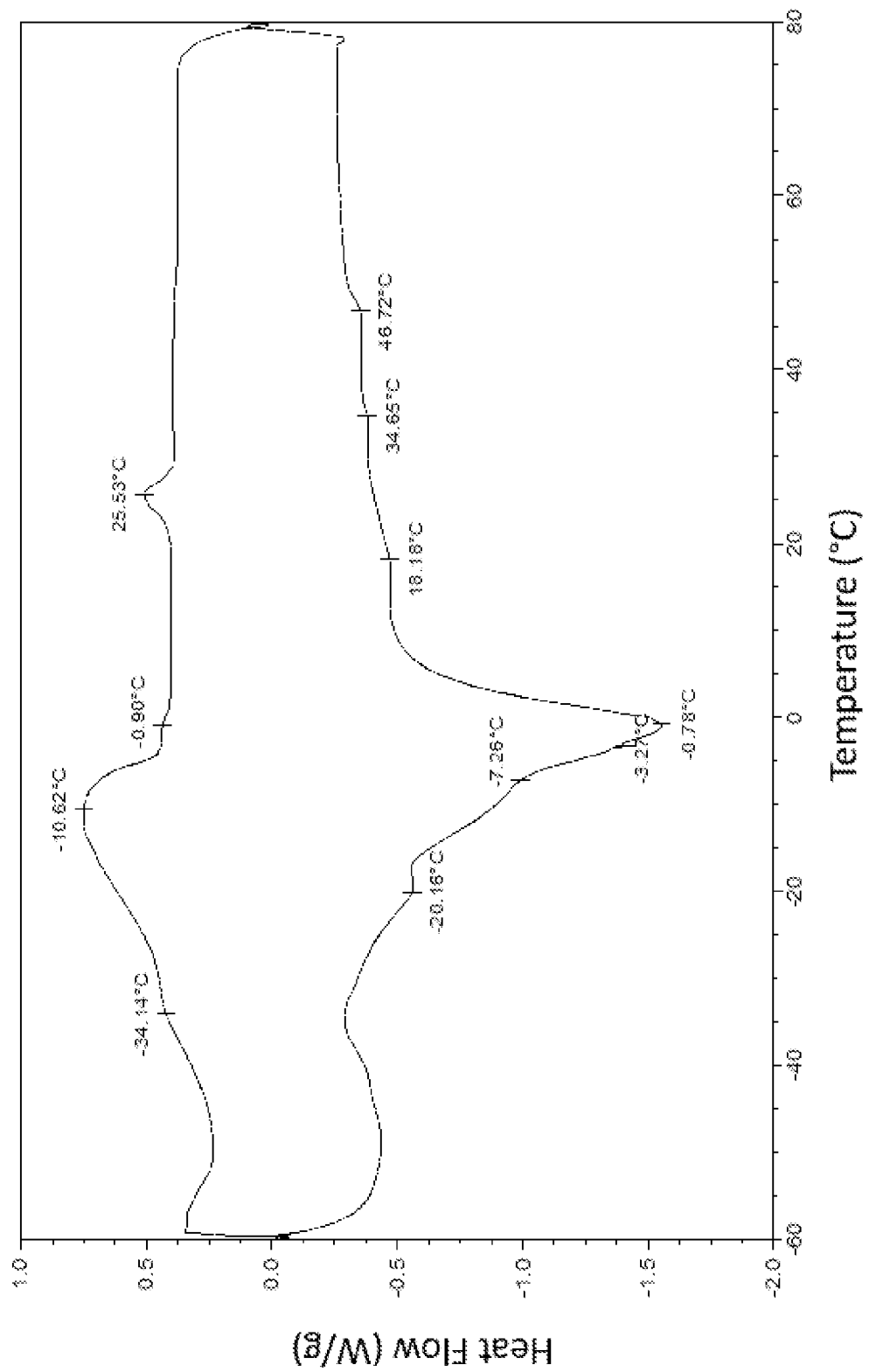
FIG. 3 shows a representative melting and cooling thermogram of a disclosed shortening blend composition.

In the present example, thermal profiles were obtained using differential scanning calorimetry (DSC) of a disclosed shortening blend composition, a high oleic palm oil (HOPO), and a refined, bleached and deodorized (RBD) palm oil. Differential scanning calorimetry (DSC) is a technique that allows monitoring of a process such that via analysis of the DSC thermal profile obtained, thermal energy can be applied in a controlled manner to optimize desired parameters such as when target crystals form and melt. Moreover, DSC data can allow prediction of how a disclosed shortening blend composition can behave within food mixing, during storage, and at different temperatures. Data are shown in FIGS. 2 and 3 for a high oleic palm oil (HOPO) and a disclosed shortening blend composition, respectively. The thermal profile data show that show that the crystallization curve and the melting behavior of a disclosed shortening blend composition was more stable compared to a high oleic palm oil, i.e., this is evidenced by the shifted spike in the curve. The data from FIGS. 2 and 3, and similar data obtained for an RBD oil, are detailed in Table 2 below, which shows temperature of peaks identified by DSC in a disclosed shortening blend composition, a high oleic palm oil (HOPO), and a refined, bleached and deodorized (RBD) palm oil.

TABLE 2

| DSC THERMOGRAM | | HOSS | HOPO | RBD |
|---|---|---|---|---|
| HEATING | High-T (° C.) | 46.72 | 26.57 | 33.76 |
| | | 34.65 | — | — |
| | | 18.18 | 11.29 | 22.5 |
| | Low-T (° C.) | -0.78 | 1.11 | 5.93 |
| | | -3.27 | 1.76 | 2.51 |
| | | -7.26 | 5.55 | — |
| | | -20.16 | -18.13 | -22.09 |
| COOLING | High-T (° C.) | 25.53 | 5.9 | 14.94 |
| | Low-T (° C.) | 1.45 | — | — |
| | | -10.06 | -9.67 | -2.02 |
| | | -34.14 | -31.27 | -19.89 |

Example 4

Figure 4:
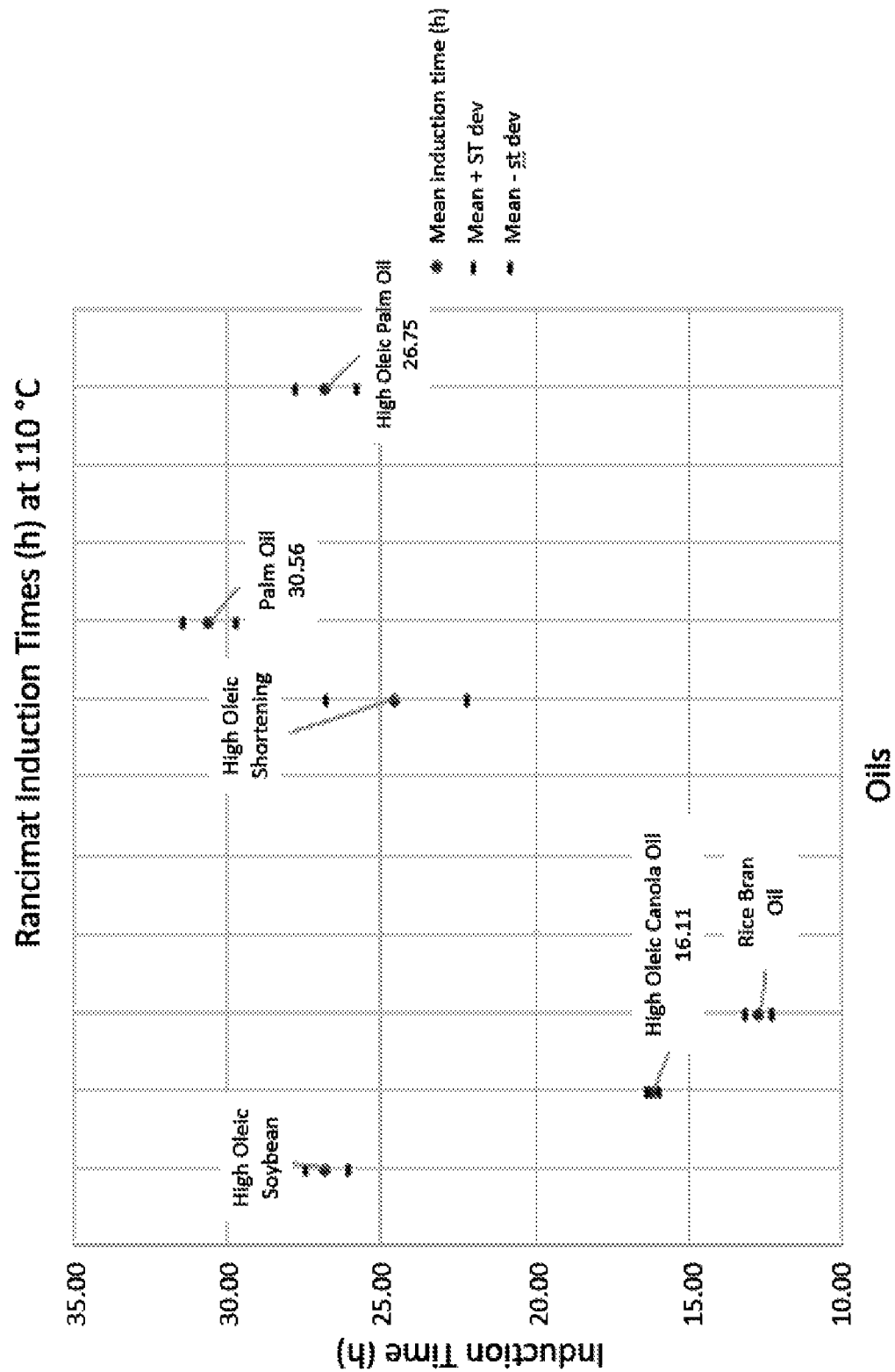
FIG. 4 shows representative data pertaining to induction times determined at 110° C. using AOCS Official Method Cd 12b-92 with a Methrom Rancimat instrument.

The oxidative stability index (OSI) for a disclosed shortening blend composition was determined, and compared to conventional high oleic oils, standard palm oil and rice bran oil. The OSI is a measure of how quickly an oil will oxidize using an accelerated aging process of to determine the "induction" time (h), and thereby provide an assessment of values pertinent to frying stability and the shelf life. In the data described herein, the OSI was determined using AOCS Official Method Cd 12b-92 with a Methrom Rancimat instrument. Data are shown in FIG. 4. The data show a disclosed shortening blend had a higher induction time than conventional high oleic canola oil and rice bran oil, but a similar induction time versus high oleic soybean oil and high oleic palm oil. The data indicate that the disclosed shortening blend composition was oxidatively stabilized compared to the conventional oils tested. The disclosed methods allow preparation of a shortening blend with a wider application range compared to conventional oils with a minimal lost in shelf life.

It should be emphasized that the above-described aspects are merely examples of possible implementations. Many variations and modifications may be made to the above-described aspects without departing from the principles of the present disclosure. All such modifications and variations are intended to be included herein within the scope of this disclosure and protected by the following claims.

What is claimed is:

1. A shortening blend composition, comprising:
   a first oil with an oleic acid content of about 50% or more and a saturated fatty acid content of about 35% or less;
   a second oil with an oleic acid content of about 80% or more and a saturated fatty acid content of about 15% or less; and
   an emulsifier, wherein the emulsifier consists of a triglyceride;
   wherein the first oil and the second oil are derived from different sources; and
   wherein the shortening blend composition has a total saturated fatty acid content of about 25% to 35%.

2. The shortening blend of claim 1, wherein the first oil is a palm oil.

3. The shortening blend of claim 1, wherein the second oil is soybean oil, canola oil, rice bran oil, or mixtures thereof.

4. The shortening blend of claim 1, further comprising an antioxidant, a flavorant, a preservative, or combinations thereof.

5. The shortening blend of claim 1, wherein the total saturated fatty acid content is about 30%.

6. The shortening blend of claim 1, wherein the ratio of the first oil to the second oil is about 1:1 to about 10:1.

7. The shortening blend of claim 1, wherein the ratio of the first oil to the second oil is about 3:1.

8. The shortening blend of claim 1, wherein the first oil is present in an amount of from about 30 wt % to about 90 wt %; wherein the second oil is present in an amount of from about 10 wt % to about 70 wt %; and wherein the wt % is based on the total weight of the first oil and the second oil.

9. The shortening blend of claim 1 comprising:
   wherein the first oil is palm oil;
   wherein the second oil is soybean oil, canola oil, rice bran oil, or mixtures thereof;
   wherein the shortening blend composition has a total saturated fatty acid content of about 30%;
   wherein the first oil is present in an amount of from about 30 wt % to about 90 wt %;

wherein the second oil is present in an amount of from about 10 wt % to about 70 wt %; and wherein the wt % is based on the total weight of the first oil and the second oil.

\* \* \* \* \*